UNITED STATES PATENT OFFICE 2,158,373

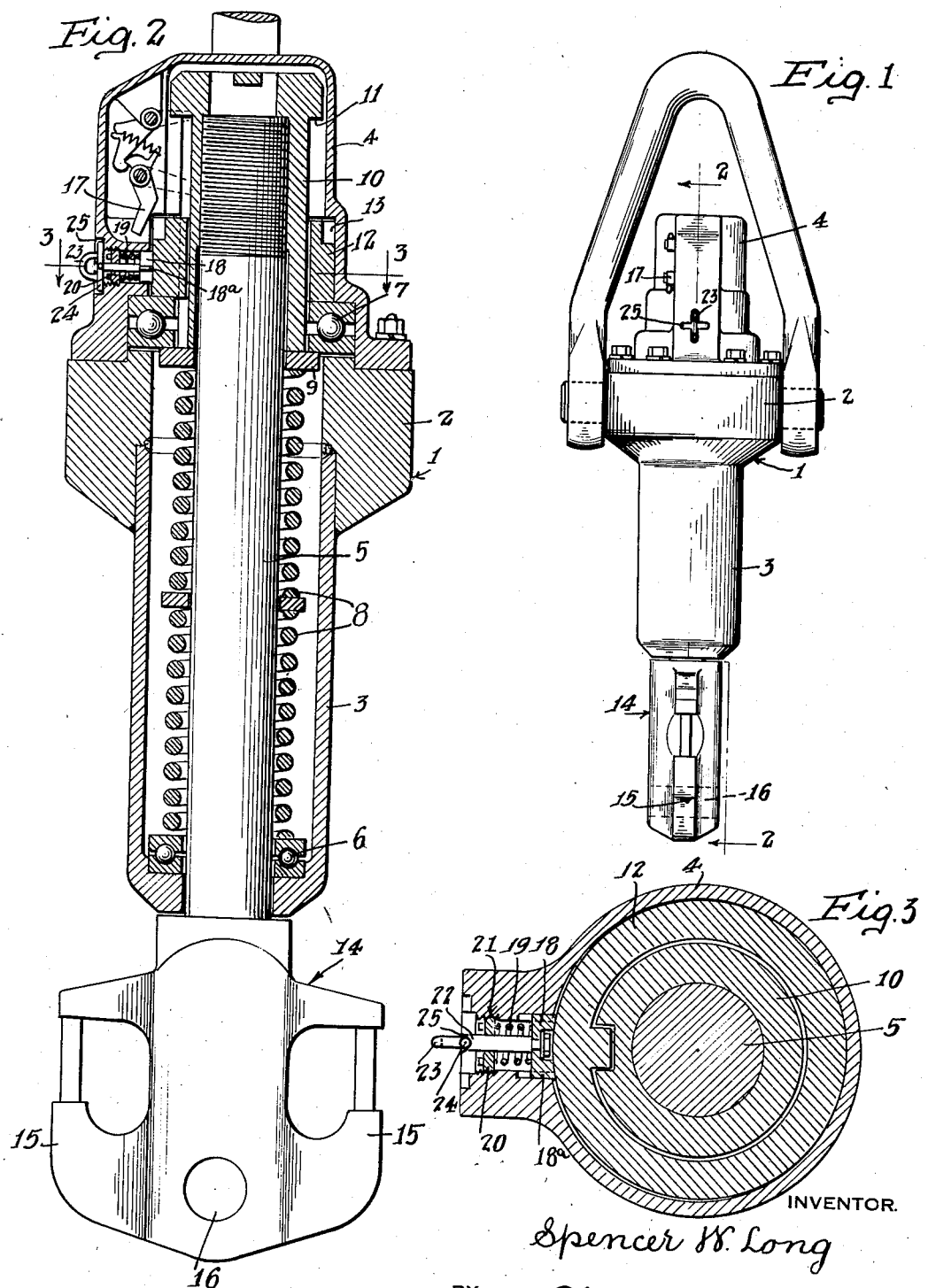

SPRING HOOK

Spencer W. Long, Inglewood, Calif., assignor, by mesne assignments, to The National Supply Company, Pittsburgh, Pa., a corporation of Pennsylvania Application April 5, 1937, Serial No. 135,109

15 Claims. (Cl. 294—82)

This invention relates to spring hooks, and more particularly to casing hooks as utilized for suspending drill pipe or casing during the drilling of wells such as oil, gas, or like wells.

It is an object of my invention to provide a spring hook or spring suspension or connecting member in which there is provided a bearing means which will be freely rotatable under a relatively light load imposed upon such a connecting member during the making up or breaking down of the casing or drill pipe, and which includes a second bearing member which will support a much greater load imposed upon such a connecting member by the weight of a greater length of drill stem or casing.

Another object of this invention is to provide a spring hook or connecting member in which there is provided a means for locking the stem of the connecting member from rotation and a means for yieldably resisting the free rotation of the stem when the lock means is released.

Other objects and advantages of this invention it is believed will be apparent from the following detailed description of a preferred embodiment thereof as illustrated in the accompanying drawing.

In the drawing:

Figure 1 is a front elevation of a spring hook or connecting member embodying my invention.

Figure 2 is a sectional side elevation on a larger scale taken mainly in vertical mid-section substantially on the line 2—2 of Figure 1.

Figure 3 is a sectional end view taken substantially on the line 3—3 of Figure 2.

In the preferred embodiment of my invention illustrated in the accompanying drawing, 1 indicates the body of the hook or connecting member which is formed of a trunnion section 2, the lower bearing supporting and enclosing member 3, and a cap member 4. Mounted within the body 1 and enclosed therein is a stem 5. The stem 5 is rotatably supported on the low capacity bearing 6 positioned at the lower end of the member 3 and by the higher capacity bearing 7 positioned immediately above the trunnion portion 2 and within the cap 4. Supported upon the bearing 6 are springs 8 which surround the stem 5. The springs 8 at their upper end engage the plate 9. Mounted on the stem 5 is a collar 10 providing a load-supporting shoulder 11. Splined on the cylindrical portion of the collar 10 is a lock ring 12 having lock detents 13 formed therein. Secured to the lower end of the stem 5 is a connecting member 14. The connecting member 14 is of the ram's horn type, including the oppositely extending ram's horn 15 and the aperture 16. The aperture 16 is adapted to receive any suitable type of connecting member for connection with the bail of a single bail elevator or the like. A locking pawl 17 is mounted within the cap 4 and the lock structure as illustrated is of the type of construction disclosed in applicant's copending application, Serial No. 94,011, filed August 3, 1936, for Spring hook.

Mounted within the cap 4 is likewise a friction brake, including a brake shoe 18, which is adapted to engage the periphery of the lock ring 12. The brake shoe 18 is resiliently urged into engaging position by means of a spring 19 which is interposed between the brake shoe 18 and a collar 20 which is threaded into the opening 21 formed in the cap member 4. Guides 18a are formed on the shoe 18 to insure proper engagement. A stem 22 is connected with the brake shoe 18 and extends axially of the spring 19 and is provided with a handle 23 by means of which the brake shoe 18 may be withdrawn from engagement with the periphery of the lock ring 12. In order to hold or maintain the brake shoe 18 from braking position when desired, the stem 22 is provided with a cross bar 24 which is adapted to be engaged in slots or recesses 25 formed at the outer end of the opening 21 to hold the brake shoe 18 away from the collar 12.

In operation the spring hook or connecting member embodying my invention has, as will be apparent from the foregoing, two bearings 6 and 7, which sequentially act to support the load suspended from the member 14. The lower bearing 6 supports the springs 8, which in turn resiliently support the stem 5 and the collar 10. This construction permits of the use of a relatively low capacity bearing 6 which will withstand the load imposed to the extent of the pressure of the springs 8. This enables me to use a very sensitive bearing 6 which permits of the easy rotation of the shank 5 when a stand of pipe or casing is suspended from the member 14. So as not to impose the full weight of the drill stem or casing on the springs 8 and bearing 6, the second bearing 7 is provided, which has a much greater load-carrying capacity than the bearing 6. The bearing 7 takes the full load of the drill pipe or casing excepting that portion carried by the bearing 6. The load imposed upon the bearing 7 is transmitted from the stem 5 through the collar 10 to the shoulder 11 which engages with the upper end of the lock ring 12. The lock ring 12 is positioned upon the upper race ring of the bearing 7. The larger bearing 7 does not of necessity require the same sensitive rotation properties as the bearing 6 for the obvious reason that when the load of the entire drill stem is supported, it is only infrequently that the stem 5 is called upon to rotate in service. One of the purposes of the bearing 7 is to permit the free rotation of the member 14 as the drill stem descends into the hole. It is the natural tendency of the bit supported by the drill stem to spiral its way down into the hole, and if the pipe is not free to rotate, there is always the hazard of the pipe being unscrewed as it descends.

In addition to the lock provided by the lock pawl 17 and the detents 15 of the lock collar 12, the frictional brake is provided to restrain the free rotation of the shank or stem 5 when the same is released from positive locking engagement. The connecting member 14 at the lower end of the stem or shank 5, in addition to the ram's horns 15 for receiving the links of a double link elevator, is likewise provided with the hole 16 which may be used to support a clevis to carry the single link of the single link type elevator.

Having fully described my invention, it is to be understood that I do not wish to be limited to the details herein set forth, but my invention is of the full scope of the appended claims.

I claim:

1. In a device of the class described, the combination of a body having a central bore, a pair of supporting shoulders on said body longitudinally spaced along the axis of said bore, a shank extending through the bore and provided with a pair of corresponding abutments, separate bearing means of different capacities supported on said shoulders, resilient means surrounding said shank within said bore and interposed between one of said abutments and the bearing means of lesser capacity, the other abutment and bearing means being adapted to provide a stop to limit the relative longitudinal movement of the shank and body.

2. In a load carrying device, the combination of a body having a pair of supporting shoulders, a shank extending through the body and provided with a pair of corresponding abutments, bearing means on each shoulder, resilient means interposed between one of said bearing means and a corresponding abutment, the other bearing means and abutment being operatively associated to limit relative movement between the body and shank in the direction causing compression of the resilient means, a lock member supported on one of said bearing means and associated with said shank in slidable and non-rotative relation, and releasable means adapted to prevent relative rotation between said lock member and said body.

3. In a load carrying device, the combination of a supporting member, a load carrying member supported thereby and adapted for longitudinal and rotary movement relative thereto, an element slidably and non-rotatably mounted relative to one of said members, releasable means carried by the other of said members to positively lock said element against relative rotation therewith, and brake means adapted to act resiliently to frictionally engage said element to impair the freedom of swiveling upon the positive lock means being rendered inoperative.

4. In a load carrying device, the combination of a supporting member, a shank member mounted axially of the supporting member and adapted for rotary and longitudinal movement relative thereto, resilient means carried by the supporting member for supporting the shank member, said shank having a pair of axially spaced abutments associated therewith, bearing means carried on the supporting member, means to limit the longitudinal movement of said bearing means relative to said supporting member, said bearing means being operatively disposed between said abutments to limit the travel of the shank in either direction.

5. In a device of the class described, the combination of a supporting member, a shank member mounted axially of the supporting member and adapted for rotary and longitudinal movement relative thereto, resilient means carried by the supporting member for supporting the shank member, an anti-friction bearing including upper and lower plates, said bearing being mounted on said supporting member and confined against substantial axial movement relative thereto, and separate means associated with said shank and cooperating with each of said plates whereby the upper and lower plates act alternately to provide a rotatable stop shoulder for the shank in its lowest and highest position, respectively.

6. In a device of the class described, in combination, a member having a shoulder, means to pivotally support said member, said pivotal support being substantially above the plane of said shoulder, a spring supported on the shoulder, a shank extending through the member, means including an anti-friction bearing at one end of the spring to rotatably support said shank, and separate bearing means mounted on the member adapted to provide a shoulder to limit the downward movement of the shank and independently support the total applied load on the shank except for that portion of the load carried by said anti-friction bearing.

7. In a load-carrying device, the combination of a body having a pair of supporting shoulders, a shank extending through the body and provided with a pair of corresponding abutments, bearing means on each shoulder, resilient means interposed between one of said bearing means and a corresponding abutment, the other bearing means and abutment being operatively associated to limit relative movement between the body and shank in the direction causing compression of the resilient means.

8. In a load-carrying device, the combination of a body having a pair of supporting shoulders, a shank extending through the body and provided with a pair of corresponding abutments, bearing means on each shoulder, a spring interposed between one of said bearing means and a corresponding abutment, the other bearing means and abutment being operatively associated to limit relative movement between the body and shank in the direction causing compression of the spring, a member supported on one of said bearing means and associated with said shank in slidable and non-rotative relation, brake means including an element adapted to frictionally contact said member to impair the freedom of rotation of the shank relative to the body, and resilient means acting to urge said element toward its contacting position.

9. In a device of the class described, the combination of a supporting member, a load carrying member supported thereby and adapted for longitudinal and rotary movement relative thereto, a lock ring slidably and non-rotatably mounted relative to the load-carrying member, releasable means carried by the supporting member and adapted to selectively lock said lock ring positively against relative rotation therewith, brake means including an element adapted to frictionally contact said lock ring to impair the freedom of rotary movement of the load-carrying member, upon the positive lock means being rendered inoperative, and resilient means acting to urge said element toward its contacting position.

10. In a load-carrying device, the combination of a body having an extension depending therefrom, a shank extending through said body and extension, a collar secured to said shank and having an abutment operatively associated therewith, said extension being provided with a supporting shoulder near its lower end, resilient means operatively interposed between said shoulder and said abutment and adapted to yieldably support said shank on said body, thrust bearing means supported on said body adjacent the upper end of said resilient means, a lock member slidably and non-rotatively mounted relative to said collar and supported on said thrust bearing means, stop means on said collar adapted to cooperate with said lock member to limit longitudinal movement of the shank relative to said body, and releasable means adapted to prevent relative rotation between said lock member and said body.

11. In a device of the class described, the combination of a supporting member, a shank member mounted axially of the supporting member and adapted for rotary and longitudinal movement relative thereto, resilient means carried by the supporting member for supporting the shank member, said shank member having an abutment operatively associated therewith, thrust bearing means carried on said supporting member and confined thereby against substantial longitudinal movement relative thereto, said bearing means and said abutment being adapted to cooperate to limit the relative longitudinal movement between said members.

12. In a device of the class described, the combination of a supporting member, a shank member mounted axially of the supporting member and adapted for rotary and longitudinal movement relative thereto, resilient means carried by said supporting member and adapted to support the shank member, bearing means adapted to provide a rotatable mounting for said resilient means relative to one of said members, said shank having a pair of axially spaced abutments associated therewith, thrust bearing means mounted upon said stationary member and operatively interposed between said abutments, said thrust bearing means being adapted to cooperate with said abutments to limit the travel of the shank in either direction.

13. In a device of the class described, the combination of a body having a pair of supporting shoulders, a shank extending through the body and provided with an abutment, bearing means on each shoulder, resilient means mounted on one of said bearing means and adapted to support the shank, said abutment and the other bearing means being operatively associated to limit relative movement between the body and shank in the direction causing compression of said resilient means.

14. In a device of the class described, the combination of a supporting member, a shank member mounted axially of the supporting member and adapted for rotary and longitudinal movement relative thereto, a compression spring carried by said supporting member and adapted to support the shank member, a thrust bearing positioned at one end of said compression spring to provide a rotatable mounting for said compression spring relative to one of said members, cooperating parts on said members adapted to provide a stop to limit downward travel of said shank member under the influence of an applied load, an abutment operatively associated with said shank, and a second thrust bearing mounted upon said supporting member and adapted to cooperate with said abutment to limit upward travel of said shank member under the influence of said compression spring.

15. In a device of the class described, the combination of a supporting member, a shank member mounted axially of the supporting member and adapted for rotary and longitudinal movement relative thereto, a thrust bearing on said supporting member, a compression spring carried on said thrust bearing and adapted to support the shank member, cooperating parts on said members adapted to provide a stop to limit downward travel of said shank member under the influence of an applied load, an abutment operatively associated with said shank, and a second thrust bearing mounted upon said supporting member and adapted to cooperate with said abutment to limit upward travel of the shank member under the influence of said compression spring.

SPENCER W. LONG.